June 22, 1965  M. C. FERNANDEZ ETAL  3,190,000
MAP CONTROLLED DEVICE FOR FEEDING CORRECTIONS
TO A GUIDANCE SYSTEM Filed May 8, 1961  3 Sheets-Sheet 3

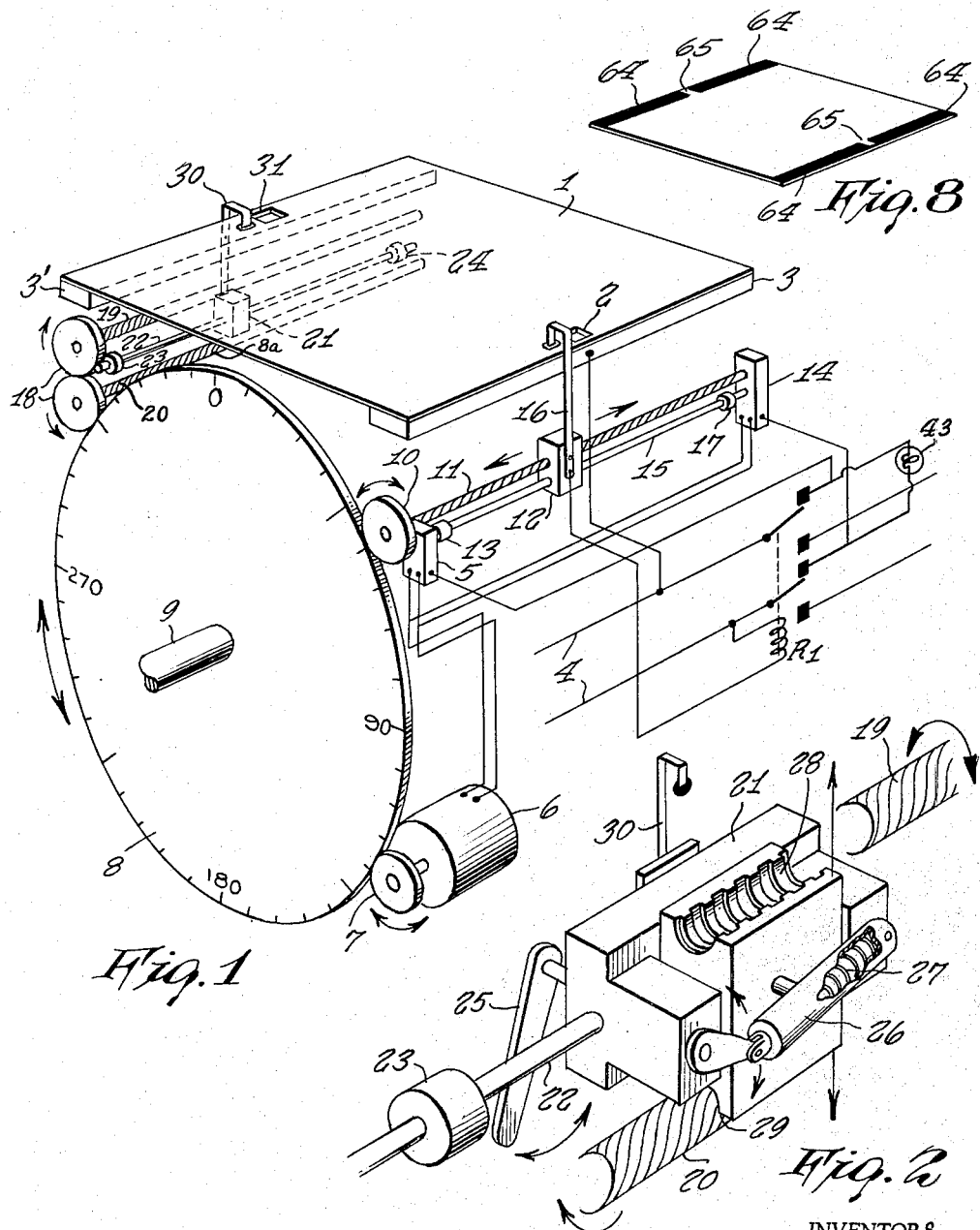

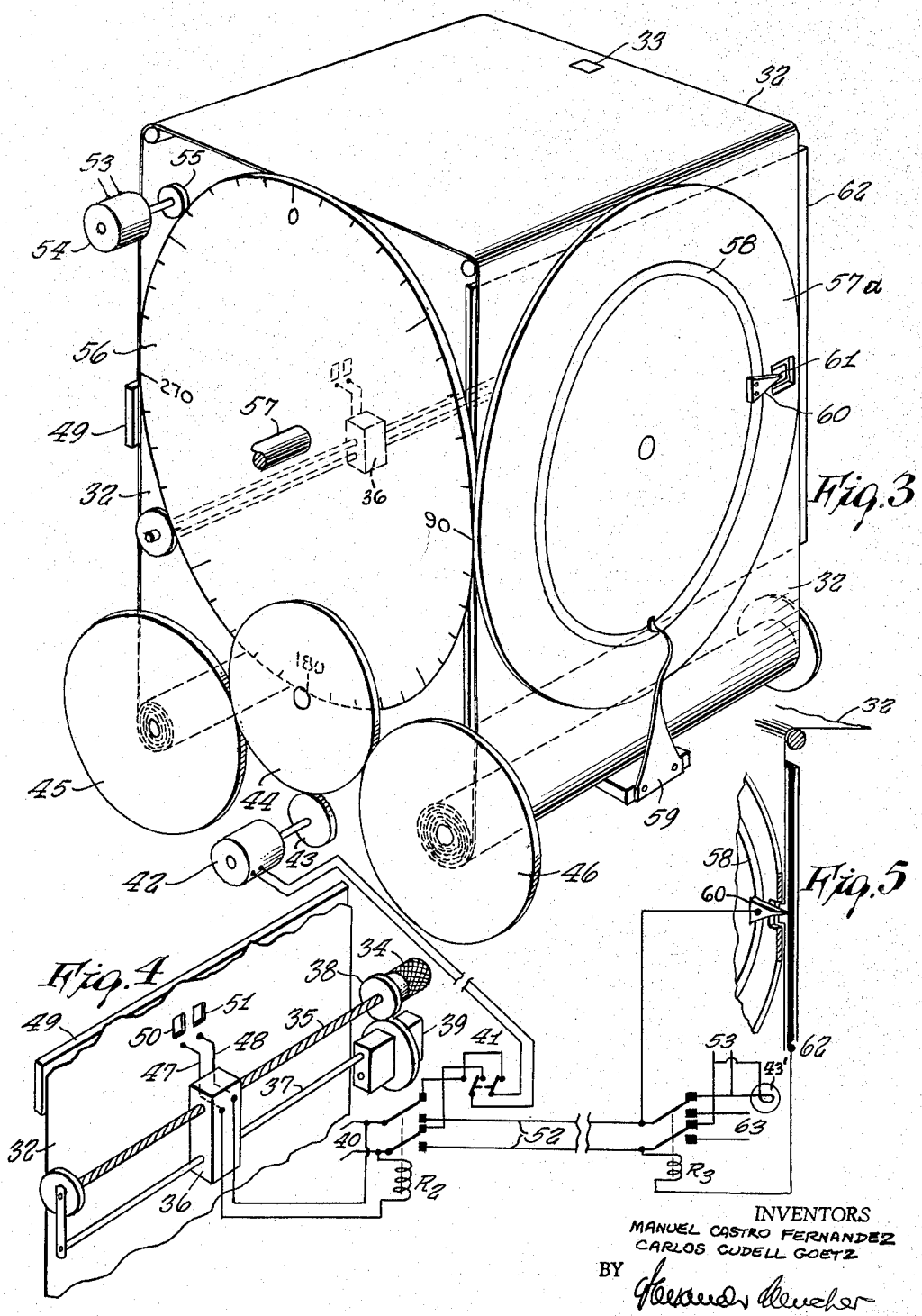

INVENTORS
MANUEL CASTRO FERNANDEZ
CARLOS CUDELL GOETZ
BY
ATTORNEY

United States Patent Office 3,190,000
Patented June 22, 1965

3,190,000
MAP CONTROLLED DEVICE FOR FEEDING
CORRECTIONS TO A GUIDANCE SYSTEM
Manuel Castro Fernandez, Canillojas, Madrid, Spain, and
Carlos Cudell Goetz, Avenida Luiz Bivar 36-5E,
Lisbon, Portugal
Filed May 8, 1961, Ser. No. 108,328
2 Claims. (Cl. 33—1)

Our invention relates to apparatus for making corrections in position indicator navigation instruments and more particularly to an automatic system for the application and control of corrections in position indicators as used in navigation, capable of determining and correcting, while in flight, deviations from the magnetic, gyroscopic or similar reference indications. The apparatus also includes novel means for the changing of maps and the making of corrections in such position indicator instruments used in navigation.

Automatic equipment is known, for example as disclosed in Spanish Patents Nos. 227,820 and 236,411, for indicating on a plan or map the position occupied by a moving body. Experience gained in the use of such equipment has shown that in present day navigation, a heavy onus of work is imposed on the navigators, and great difficulty is encountered in applying manual corrections which are to be fed into such navigating equipment. For example, this work usually entails keeping the angular inclination or value assumed by another geographic reference line in a certain relationship to a reference line of the indicator. The magnetic declination prevailing in the flight area must be determined and added, and to this may also be added other corrections relating to the navigation system. The overall angular value obtained is then applied as a corrective value and transmitted by electrical or mechanical systems of a fmiliar type to the computing system of the navigating equipment.

The indicator of these devices has a separate geographic reference line which assumes a position with respect to the other reference line, and to this is added the magnetic declination of the flight area, and other possible corrections relevant to the navigation system. The overall angular value is then applied by rotating a graduated disc, for the purpose of obtaining readings with reference to a "lubber" line, and the correction value is transmitted simultaneously with its determination by means of a mechanical or electrical system to the computer system of the navigating equipment.

The use of such systems and apparatus in this manner entails not only a burden of time and labor on the part of the navigators, and the difficulty in accurately making the manual corrections, but there is also much time consumed in making the changes in the maps, in introducing the corrections called for by the navigating instruments, and in maintaining the inclination or angular value in proper relationship with respect to a reference line of the indicator.

The problem assumes even greater importance in aircraft approach areas, in landing operations or mooring, since it is necessary to alter the maps frequently so as to assure a higher degree of precision as regards the position, and consequently the crew has the heaviest work load precisely at such times, while the pilot himself is busy manipulating the vehicle.

On the other hand, any human error introduced in the application of the correction values, as well as any involuntary and uncontrolled deviations from those values, will give rise to a malfunctioning of the system, and give false location readings for the moving body on the position indicator, with the consequent risk of error in navigating, and danger of causing other related problems.

In view of the fact that the magnetic declination values for any given place is known along with the reference line of the plan or map with respect to the reference line of the indicator face, and since the bearings taken by the navigation instruments are applied to the computer system without any appreciable errors, it is certain indeed that the indicators themselves, such as described in the above-mentioned Spanish Patents 227,820 and 236,411, as well as other similar indicators, will mark with precision the place at which the moving body happens to be.

Any error in this marking may be verified while the plane is on the ground or rolling along the landing strips, and even in flight by means of radio signals and airways beacons, or by observing the map screens of the vertical navigation radars. Such verifiable errors will undoubtedly have been caused by errors in the bearing signals provided by the compass system, which may be affected by static charges or other electrical phenomena, or even by the distribution and type of cargo carried by the vessel. These compass errors will be immediately identified, inasmuch as they will be equal to and contrary to the value which must be introduced into the corrector in order that the navigation indicator may mark the position of the vessel with precision.

To this type of position calculators, values may be carried which pertain to the bearing of the vessels, and which issue from the directional gyroscopic systems in lieu of those issuing from the electronic compasses, and all errors can be ascertained in the same manner as above mentioned for the case of electric compasses.

It is therefore an object of the present invention to avoid the above-mentioned problems and to assure a higher degree of safety and accuracy in navigation.

It is a further object of the invention to provide an apparatus comprising electro-mechanical control and automatically operated systems which can be easily applied to the afore-mentioned known types of navigation computers.

In its preferred embodiment, the system according to the invention comprises a manual control device with a counter calibrated in numerals, by means of which counter the number of the desired map is selected, whereupon the electro-mechanical system becomes automatically actuated until the exact map desired is placed in front of the indicator. Once this phase of the operation has been accomplished, by manual or automatic means, the electro-mechanical system then introduces into the navigation computer the correction corresponding to the map which is to be employed. The system or apparatus of the invention then operates so as to prevent the appearance of the readings describing the position of the moving body on the map or chart mounted on the screen until the prior cycles have been terminated, thus affording a high factor of safety in the employment of this type of navigational computer systems, and preventing the consequences of human errors of omission or of lapses of memory.

The electro-mechanical system of the invention feeds into the navigating computer a value or impulse corresponding to the respective correction on the map to be used, and the system prevents the indicators, which mark the position of the moving body on the map or chart lodged on the screen, to appear until completion of the correction cycle. In the meantime, a red tell-tale light remains burning during the time that the correction does not exhibit its fully corrected value, thus affording a high degree of safety in the use of this type of computing system in navigation, by overcoming the dangers caused by lapses of memory on the part of the operator, or by the feeding of erroneous correction values, or by involuntary and uncontrolled deviations of the said corrections, because of the fact that the automatic mechanism of the invention eliminates any such likelihood in practice.

The values for the declinations of the compass at a given place are known, along with the geographic orientation as shown by the inclination of the reference line of the chart or geographic map with respect to the reference line in front of the indicator, and any other correction value can then be added. Consequently, since the direction by which the signals of the radio-beacons as given by the navigation instruments are introduced into the computing system, there is no question but that the position indicators will now mark with precision the position of the moving body at any given moment.

Any error in this marking which may occur while the plane is grounded or rolling along the landing strip, and even in flight, may be verified by means of radio signals issuing from vertical radiation beacons mounted along the airway, or one of the comparisons with the reproduction of the flight area obtained, e.g. on the screen of a vertical radar. Upon comparing same with the position of the moving body on the map of the indicator, such errors will unquestionably be found to be due to errors in the bearing signal produced by the compass system which may be affected by static charges or other electrical phenomena, and even by the distribution and type of cargo which the vessel carries.

These compass errors will immediately be identified, inasmuch as they will be equal and opposite to the value which has to be fed into the corrector in order that an exact marking of the position of the vessel may appear on the navigation indicator.

There are electrical compasses which render it possible to introduce the corrections in a simple manner while in flight, but there are others where the application of these corrections is more complicated and must be done on the ground, but even in the latter case there is at least the opportunity of readily rectifying the manual compass, and thus at all times there is available the exact value of the difference, and by virtue of this it is possible to navigate with the necessary discipline.

Furthermore, in some position indicators, as for instance those disclosed in the aforementioned Spanish patents, it is feasible to introduce corrections regarding position by manual means, although the electrical compass coupled with the indicator cannot be rectified in flight. Thus, the position reading will be rectified for the continued flight, notwithstanding the fact that the compass has not been corrected.

The system of the present invention makes it easy to control and correct, with the moving body in action, the calibration of the compass and also to identify in normal conditions of navigation, the errors that may have been induced in the compasses by static charges or other causes, thus assuring a correct bearing.

It is apparent from the above that into these position calculators can also be fed bearing values issuing from directional gyroscopic systems, and the like, in lieu of those issuing from electronic or electrical compasses, and any error which might occur can be determined in a manner similar to that described above for the case of an electric compass.

Further objects, features, and advantages of the invention will become more apparent from the following detailed description of the embodiments shown by way of example on the accompanying drawings, in which:

FIGURE 1 is a diagrammatic and perspective view of the system used to actuate the automatic correction, where maps or charts are employed as individual or independent sheets.

FIG. 2 is a fragmentary perspective view of the mechanical reversing system for the travel of additional spindles for the device of FIGURE 1.

FIG. 3 is a perspective view of the map selection and automatic correction mechanism, where rolled-up maps are employed.

FIG. 4 is a fragmentary and diagrammatic view in perspective of the map selection system of FIG. 3.

FIG. 5 is a fragmentary and diagrammatic view of the contact system of the correction mechanism of FIG. 3.

FIG. 8 is a perspective view of a map or chart for use with the apparatus, but without perforations, and instead provided with metal coatings, wherein the insulated portions or points between the metal take the place of the perforations of the other embodiments, for controlling the drive motor.

Figure 6:
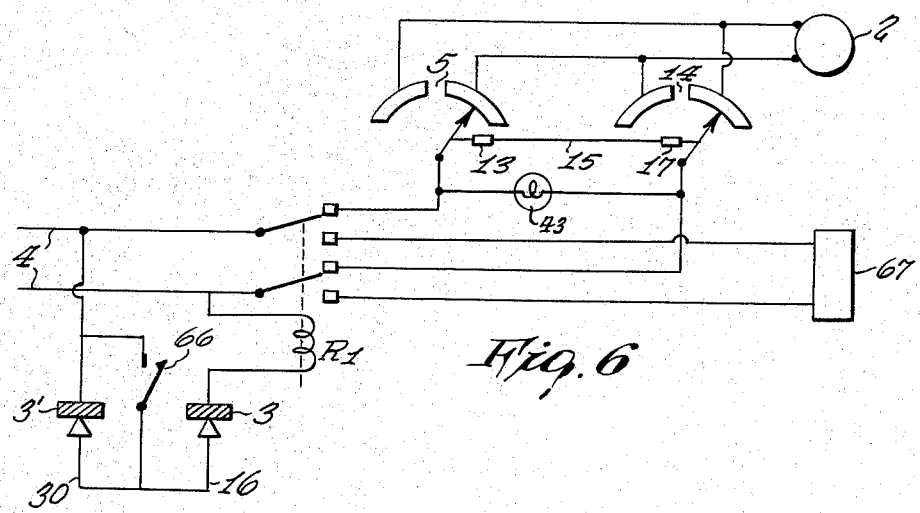
FIG. 6 represents a schematic wiring diagram of the system where charts made of electrical insulating material are employed, these charts being provided with perforations in accordance with those shown in FIG. 1.

The following disclosure describes in detail the entire automatic system employed for the application of the previously-mentioned corrections, in those cases where individual chart sheets are employed. Also described is the entire automatic system for the changing of the said maps when rolled-up maps are employed, including the safety system, which is predicated on the fact that the indicator or the screen does not become illuminated until all the steps have been completed respecting the change of maps and application of corrections. In the control and safety system an alarm indicator is provided which does not disappear as long as the correction is not yet properly introduced; and the indicator on the screen does not become illuminated until all the steps have been completed respecting the change of maps and application of corrections, and until the automatic correction has been fully introduced.

The system can obviously be combined with an automatic system for changing the maps, as well as for manual changing of the maps.

In FIG. 1 is shown the map 1 mounted on a sheet of insulating material, provided with a bore or opening 2, comprising, as will be hereinafter described, a contact means and supported on a base 3 and 3' of electrically conducting material.

The electrical voltage in the leads 4 from a source of current serves to actuate a reversible motor 6 by means of contacts illustrated in FIG. 1 in their position of rest, and forming part of a relay R1. These contacts are respectively connected across a pair of switches 5 and 14, which respectively serve to actuate the motor 6 to run in one or the other direction. A disc 8 on which is mounted the correction indicator is geared to the motor 6 by means of a transmission 7 consisting of one or more gears. The correction indicator disc 8 transmits its value, corresponding to its degree of rotation relative to a reference line 8a, to the navigation computer (not shown) by means of a shaft 9.

A power take-off gear 10 is coupled with the disc 8 for actuating a worm or spindle 11 which rotates to axially drive a carriage 12. Movement of the carriage 12 toward the left of FIG. 1 causes it to abut and press against a stop collar 13 which is mounted integrally with a guide rod 15. The guide rod 15 is supported between the two switches 5 and 14 and passes through the carriage 12 to guide the movement of the latter. Pressure of the carriage 12 against the stop collar 13 overpowers the dead center positions of the springs in the conventional electrical switches 5 and 14, and thus reverses the current input into the motor 6, to drive the latter in the opposite direction of rotation. Reversal of rotation of the motor results also in a reversal of the rotation of disc 8, gear 10, spindle 11, and thus also a reversal in the direction of travel of the carriage 12, which will then move toward the right relative to FIG. 1.

A contact 16 is fastened to carriage 12 for lateral movement therewith and is electrically connected to the coil of relay R1. The contact 16 penetrates the hole 2 and makes contact with the conductor plate 3, thus closing the relay R1 to open the contacts thereof which lead to switches 5 and 14, thereby bringing to a halt the motor 6 which drives the correction disc 8. Consequently, disc 8 will remain at a position governed by and corresponding to the point at which the particular hole 2 will have been reached in the map 1.

If at the onset of the operation of the motor 6, the contact 16 should find itself to the right of the hole 2, and the carriage 12 should move to the right relative to the view of FIG. 1, it would continue to do so until it comes up against the stop collar 17 which is integral with or fixedly mounted upon the rod 15, thus actuating the switches 14 and 5 to reverse the direction of travel of the carriage 12, and the latter will not halt until contact 16, passing through the hole 2, closes the circuit of the relay R1 by contacting conductor base 3.

If greater precision is sought in halting the correction system, a second system of gears 18 may be added. A pair of gears 18 is engaged with the outer periphery of the correction disc 8 to actuate, in mutually opposite directions of rotation, two spindles 19 and 20, which drive in one or another direction a second carriage 21 along its guide rod 22. The rod 22 is provided with stop collars 23 and 24 fixedly mounted at the opposite ends thereof. As shown in FIG. 2, when the lever 25 of the travelling carriage 21 abuts against one of the collars 23, 24, it actuates the toggle-joint type mechanical reversing device 26 of the carriage, and the device 26 rotates with lever 25 to overpower its dead center position against the force of a compression spring 27, until it couples an upper groove 28 to the spindle 19, at the same time disengaging the lower groove 29 from its spindle 20. The spindle 19 will now serve to drive the carriage 21 in a direction directly opposed to that in which it had been driven by spindle 20.

The worms of the spindles 11, 19 and 20 are made so that the rate of travel of the carriage 21 is greater than that of carriage 12. Therefore, while contact 16 shifts slowly across the hole 2, contact 30 will shift at a greater rate of speed, exploring a large sector of the map until it encounters the hole 31. The electrical system of the second carriage 21 is identical with that of the first carriage 12, and these two systems are connected in series, as shown in FIG. 6. Consequently, the relay R1 will not close, even though contact 16 enters through the hole 2, until contact 30 passes through hole 31 to make contact with conductor 3' (FIG. 6).

The system comprising the additional spindles and carriage 21 thus affords a higher degree of precision of the overall system, inasmuch as the space occupied by the hole 2 can, in practice, be enlarged to cover a portion or all of the zone explored by contact 30, depending upon the ratio of the travel velocities of carriages 12 and 21.

FIG. 3 shows the automatic map selection apparatus and the device for deriving the automatic correction signal to be fed into the computer, in an embodiment where rolled-up maps 32 are employed, and where such maps are provided with holes 33 enabling control of the system.

The map selection operation is carried out by means of a button or knob 34 (FIG. 4) which rotates the spindle 35, causing displacement of a carriage 36 along its guide rod 37. A series of gears 38 actuates the counter 39 which gives a reading of the number of the selected map. The current input 40 passes across the resting contacts of relay R2 to a double-pole double-throw switch 41, which, depending upon whether the selected map has a higher or a lower number than the map it replaces, connects the reversible motor 42 to rotate in one or another direction. A gear or series of gears 43 driven by motor 42 operate a spur gear 44, which in turn actuates the roller wheels 45, 46 of the map in the necessary direction.

As rollers 45, 46 rotate, the sheet of maps 32 will slide, serving as an insulator between contacts 47, 48 and the conductor plate 49 (FIGS. 3, 4) until the holes 50, 51 confronting the said pair of contacts 47, 48 makes it possible for the latter to become short-circuited across the conductor plate 49. This then actuates relay R2 to cause the map driving motor 42 to halt while the relay R2 connects current input 40 to the remainder of the circuit by means of cables 52.

The use of two holes 50, 51 makes it impossible for the coincidence of the pitch of a hole used for correction to cause stoppage of the map selector system. The two ends of the roll of maps 32, or a large opening along the width of the roll, or a metal plated strip on the map, will serve for actuating the map driving system when an error has been made in placing the reversible contact switch 41.

The current which flows across the resting contacts of the relay R2 to actuate the map selector motor 42 passes electrical lines or cables 52 when the relay R2 is active, and thence across the resting contacts of relay R3 (FIG. 5), to conductors 53 which actuate a motor 54 (FIG. 3). A gear or a series of gears 55 are driven by motor 54 to actuate the correction indicator disc 56, which by means of a shaft 57 transmits the said correction to the computer system.

Engaged with the disc 56 is a disc 57a having an identical number of teeth, and thereby also an identical movement. A conductor crown 58 is mounted on and insulated from the disc 57a and taps current by means of a contactor 59 slidable thereon. The conductor crown 58 is provided with a contact pointer 60 which, upon encountering a hole 61 in map 32 during rotary movement of the pointer, allows current to pass through the coil of relay R3 (FIG. 5), thus closing the circuit of relay R3 and causing stoppage of the rotor 54, while the current input shifts in relay R3 from cables 53 to cables 63, which feed the remainder of the circuit. The map 32 insulates the pointer 60 from the conductor plate 62 in areas where there is no hole 61. The holes of any of the maps may be situated at the most convenient site of the roll of maps, in keeping with the arrangement of the mechanisms.

A red lamp 43' (FIG. 5) is connected into the circuit so that it remains illuminated while the correction cycle is taking place, and becomes extinguished when relay R3 is energized, thus assuring and providing a visible signal that the correction has been properly applied. A lamp 43 is connected in the circuit of relay R1 which upon being energized extinguishes the lamp.

The chart or map shown in FIG. 8 is provided with metallized strips 64 along the edges, with small intervals or spaces 65, which are free of any metal, but which can be employed to function as contact means exactly as the holes 33 shown in FIG. 3 with the only difference being that it is necessary to reverse the connections of relay R1 so that in the energized position of the relay, the motor 6 would be actuated, while in the position of rest the current would flow through the balance of the circuit. Furthermore, all the map holes referred to in this specification may be similarly substituted by equivalent metal plated areas along the two planes or surfaces of the map, except for the holes described for a change of maps, which may be substituted by metal-plated spaces in a single plane or surface only.

In FIG. 6, there is shown the electrical circuit of the system shown in FIG. 1, and where the switch 66 serves to connect or disconnect the electrical portion of the system of additional spindle system which is employed for greater precision in the correcting operation.

The block 67 indicates the screen monitoring system which determines the position of the aircraft and its bearing in flight, and which will not operate until the complete cycle of correction has been accomplished, remaining disconnected as long as this correction does not have its correct value, thus preventing the pilot's use of or reliance on the equipment under erroneous conditions.

Figure 7:
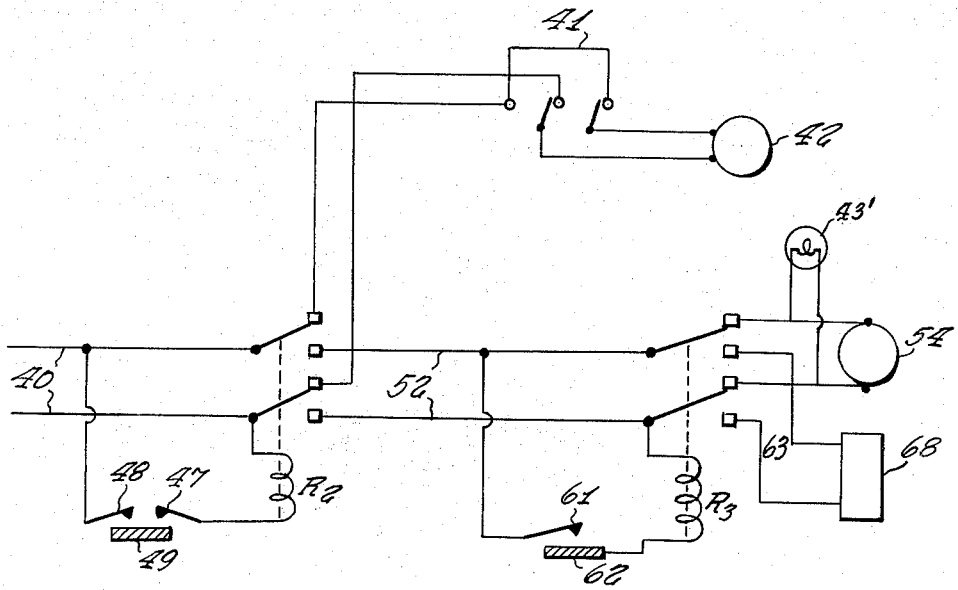
FIG. 7 shows a wiring diagram in conjunction with rolled-up maps made of insulating material such as shown in FIG. 3.

FIG. 7 shows the electrical circuits of the type specified in FIGS. 3, 4 and 5. The block 68 represents the indicator assembly of the system, which will not be connected to function until the map is selected and the requisite correction is applied, thus affording a higher degree of safety in navigation instruments.

It will be obvious to those skilled in the art, upon studying this disclosure, that devices and systems according to our invention can be modified in various respects and hence may be embodied in devices other than particularly illustrated and described herein, without departing from the essential features of the invention and within the scope of the claims annexed hereto.

We claim:

1. An automatic system for change of maps and for feeding of corrections into position indicator instruments used in navigation comprising a guidance navigation system map having contact means thereon, mechanism for feeding corrections to the guidance navigation system, motor means driving said mechanism, said contact means serving to effect the stoppage of said motor means, said contact means being located on the map with reference to the compass orientation of the map, the reference line of an indicator, the magnetic declination prevailing at the point of navigation and any other given correction proper to the system, a spindle and a contact pointer thereon, the motor means operable on the mechanism to feed corrections to the guidance navigation system also operating said spindle to cause displacement of the contact pointer, the latter pointer upon encountering a contact means on the map along which said pointer travels allowing passage of current to a conductor plate mounted on the opposite side of the map causing a stoppage of said correction motor at the precise moments when said correction attains the desired value, a second spindle and means to drive same from the first spindle and a second contact pointer operable thereby, said second spindle driving means effecting simultaneous movement with the first spindle but which effects a faster rate of displacement of the second contact pointer with respect to the first, causing the second contact pointer to explore a large segment of the map while the first pointer performs the same function over a shorter space of the map, and thus subdividing the exposed contact means corresponding to the first contact pointer into separate contact means in the area scanned by the second contact pointer to produce a higher degree of correcting precision.

2. An automatic system of application and control of corrections in position indicators such as used in navigation for determining and rectifying while in flight any deviations in magnetic, gyroscopic or similar bearings, comprising maps having contact means at suitable portions along the planes thereof located with reference to the compass orientation of the map, the reference line of an indicator, the magnetic declination prevailing at a point where the navigation is being performed, and any specific correction proper to the system, mechanism for moving the position indicators and motor means driving said mechanism to apply corrections to the position indicators of the orientation or navigation system, and operable by said contact means of the maps to control the starting and stopping of said motor, a spindle, a contact pointer secured thereto and movable thereby, the motor means operating the mechanism for said corrections also operating said spindle, a conductor plate at the opposite side of the map, said contact pointer upon encountering a contact means during travel over the plane of the map allowing current to pass to said conductor plate causing said motor means to stop at the exact moment when said correction achieves the desired value, a second spindle interconnected to move simultaneously with the first spindle but at a greater speed, a second contact pointer operable by the second spindle and movable faster than the first spindle to explore a large section of the map while the first pointer executes this exploration along a shorter space of said map thereby subdividing the zone of the contact means corresponding to the first contact pointer into a number of separate contact means in the area explored by the second contact pointer to afford a higher degree of precision in correcting.

References Cited by the Examiner

UNITED STATES PATENTS

| | | | |
|---|---|---|---|
| 2,246,496 | 6/41 | Asbury. | |
| 2,566,247 | 8/51 | Pierce et al. | 33—1 |
| 2,718,061 | 9/55 | Omberg et al. | 33—1 |
| 2,760,840 | 8/56 | Gordon | 346—8 |
| 2,771,593 | 11/56 | Straehl | 340—24 |

ISAAC LISANN, *Primary Examiner.*

LOUIS R. PRINCE, *Examiner.*